United States Patent

[11] 3,602,110

| [72] | Inventor | Thomas H. Wiggins<br>Akron, Ohio |
|---|---|---|
| [21] | Appl. No. | 772,174 |
| [22] | Filed | Oct. 31, 1968 |
| [45] | Patented | Aug. 31, 1971 |
| [73] | Assignee | Republic Steel Corporation<br>Cleveland, Ohio |

[54] LIGHTWEIGHT STEEL LAND MAT
9 Claims, 5 Drawing Figs.

[52] U.S. Cl. ................................................. 94/13,
29/455, 52/586
[51] Int. Cl. ................................................. E01c 5/00
[50] Field of Search ................................................. 29/455;
94/13; 52/586

[56] References Cited
UNITED STATES PATENTS

| 2,473,728 | 6/1949 | Rutledge | 52/586 |
| 3,030,703 | 4/1962 | Wirsing | 29/471.1 |
| 3,170,201 | 2/1965 | Nofziger | 52/586 |
| 3,172,508 | 3/1965 | Doering | 52/579 |
| 3,196,533 | 7/1965 | Ida | 29/421 |
| 3,246,437 | 4/1966 | Toney | 52/309 |
| 3,348,459 | 10/1967 | Harvey | 94/13 |
| 3,236,017 | 2/1966 | Doering | 52/579 |
| 3,301,147 | 1/1967 | Clayton | 94/13 |
| 3,319,543 | 5/1967 | Braeuninger | 94/13 |

*Primary Examiner*—Jacob L. Nackenoff
*Attorneys*—Robert P. Wright and Joseph W. Malleck ABSTRACT: A lightweight rectangular structural panel comprising two stainless steel facing sheets bonded to an aluminum honeycomb core and having identical sheet steel edge-connector rails fastened to the core and facing sheets on four sides which cooperate with the identical rails on a similar panel in combination with a spline tube to lock the panels together to form a composite mat which is suitable for use as a road or landing strip on rough and uneven terrain.

PATENTED AUG 31 1971

INVENTOR.
Thomas H. Wiggins
BY
Joseph W. Malleck
ATTORNEY

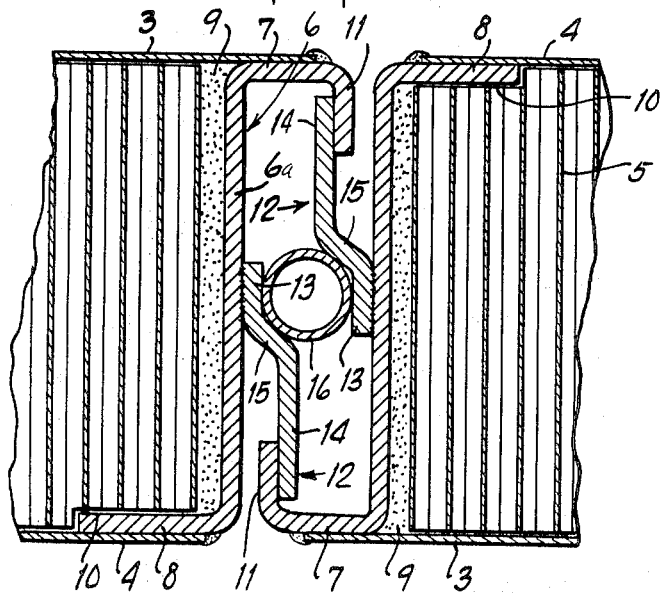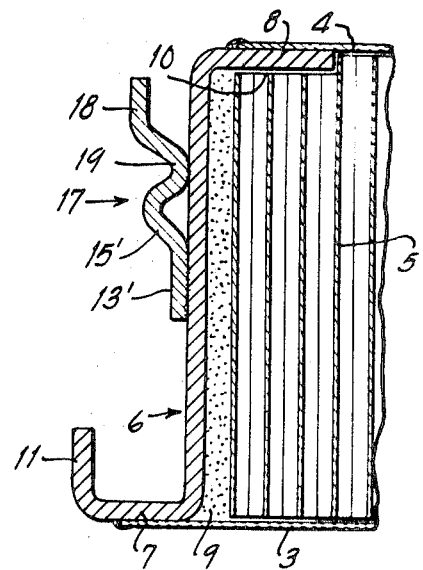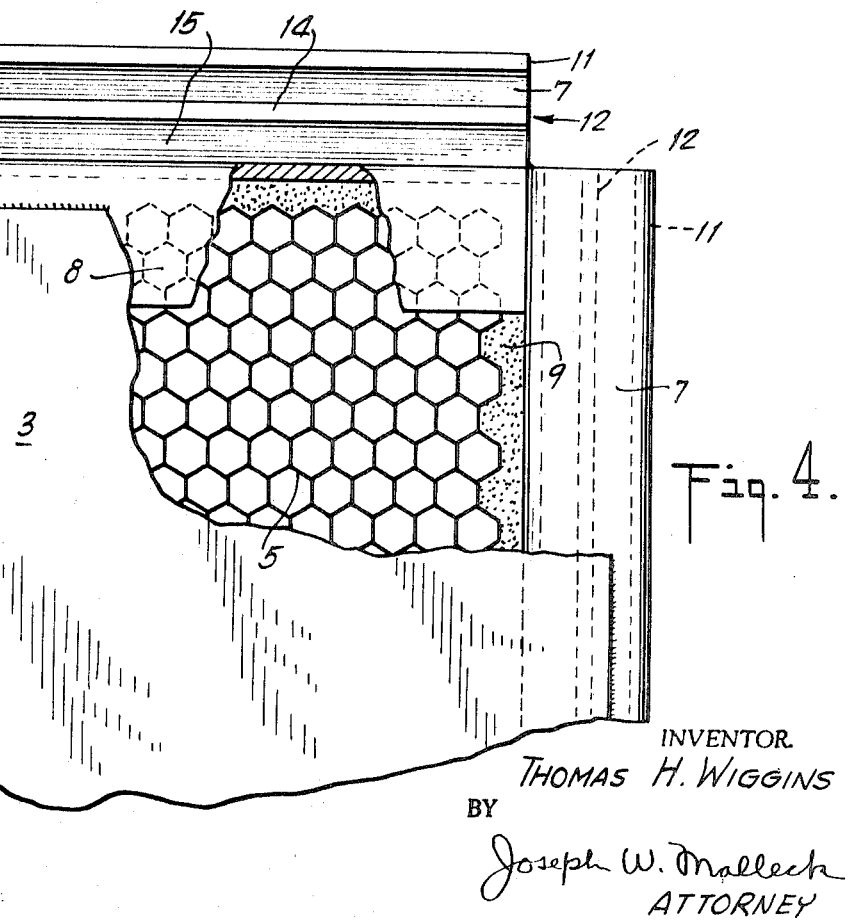

LIGHTWEIGHT STEEL LAND MAT

BACKGROUND OF THE INVENTION

This invention relates to lightweight structural units adapted to be detachably interconnected with similarly constructed units to form a composite structure and more particularly to a structural panel fitted on its four sides with edge connectors which mate with similar edge connectors on identical panels and are locked together by a spline tube to form a composite load-carrying mat or surface suitable for onsite assembly and use as an aircraft landing field, a road, or similar continuous support structure.

A number of prefabricated structural units have been designed in the past to be used with units of similar construction to form temporary, vehicle-support surfaces for use in remote areas having rugged terrain. Such units have been particularly employed in constructing aircraft landing fields and for similar military uses and generally comprise two steel sheets separated by suitable ribbing or core material and having edge members which connect in various manners with the edge members on adjoining structures to form a composite matting resulting in a flat continuous surface. As these units must frequently be transported over rough and remote terrain, and are generally manually assembled, it is necessary that the individual units be light in weight. It is also desirable that the connecting assemblies be of simple and uniform construction to permit rapid and mistakeproof assembling and dismantling.

Many of the prior structural units are fabricated from extruded sections with complex connecting members which render the fabrication comparatively expensive. Also a number of different parts are required in other designs, adding to the expense of fabrication and to difficulty and assembling.

SUMMARY OF THE INVENTION

The structural unit of the present invention is constructed of lightweight, but sufficiently strong and durable, components, with a minimum number of parts and is quite easily fabricated, requiring no extruding or other expensive operations.

The improved structural unit comprises a panel made of two stainless steel cover or facing sheets bonded to an aluminum honeycomb core and having sheet steel edge-connector rails on its four sides. The connector rails as well as the various panels are of identical construction and are adapted to cooperate in combination with a spline tube to lock the panels together so that a continuous, level, composite surface or mat may be constructed from a number of the panels in a simple and mistakeproof manner.

The improved panels are fabricated without the need for any extruded or doubled sections and the entire panel structure comprises only five different components, that is, the cover sheets, the honeycomb core members, two pieces for the edge-connector rails and the cooperating locking spline tubes. The connector rails are directly and rigidly attached to the core for good load transfer and the spline arrangement gives tighter locking.

A strong and durable landing mat or load-carrying composite surface may thus be constructed using the improved panels which is inexpensive and simple to fabricate, handle and assemble in comparison with the vehicle supporting mats of the prior art.

BRIEF DESCRIPTION OF THE DRAWINGS

FIG. 3 is a sectional view taken along the lines 3—3 in FIG. 1 showing the edge-connector structure in detail;

FIG. 4 is a partial view with portions broken away showing the detail of the corner construction of the panel of the present invention; and FIG. 5 is a sectional view similar to that of FIG. 3 showing a modification of the edge-connector structure.

DETAILED DESCRIPTION

Figure 1:
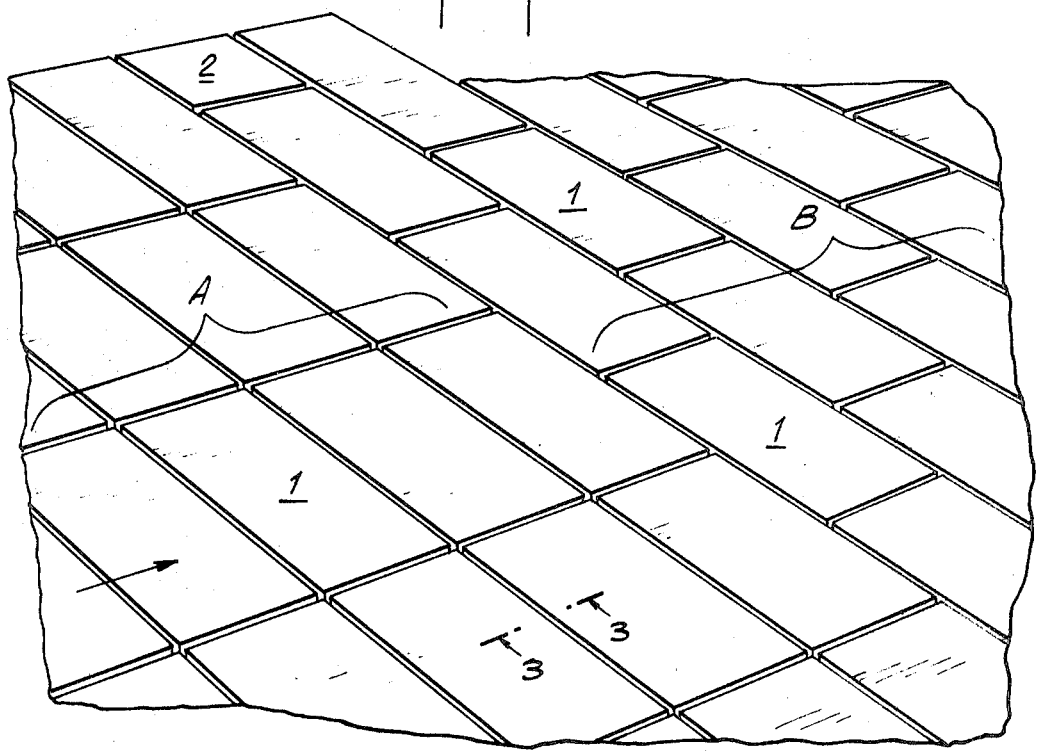
FIG. 1 is a perspective view of a load-carrying matting formed with the structural panels of the present invention and showing both linear and staggered patterns which may be used.

FIG. 1 shows a typical load-carrying surface or mat which may be constructed using the improved panels of the present invention. Such mats are generally used for supporting transporting vehicles to permit them to travel over rough terrain on which their wheels would otherwise have difficulty passing. These surfaces are particularly useful for military operations and specifically as auxiliary landing strips in remote areas. They must thus be light in weight to permit ease of transportation and assembly while also being structurally strong and durable to be able to take the impact-loading of landing aircraft.

The individual panels are shown as rectangularly shaped units 1, but it will be seen that the improved structure of the present invention may be used with panels having three, five, six or more sides. It is also shown in FIG. 1 that the panels may be assembled in a linear arrangement as shown in area A or they may be attached in a staggered pattern as shown in area B. The particular pattern to be used will depend upon the job for which the matting is being employed. As indicated in FIG. 1 the panels are assembled lengthwise across the direction of travel of a landing aircraft (indicated by the arrow) because of the increased strength which can be gained to resist impact from this arrangement. The panels are generally of uniform size and identical construction but it will be noted that smaller auxiliary end panels as at 2 may be used if necessary when employing the staggered arrangement.

Figure 2:
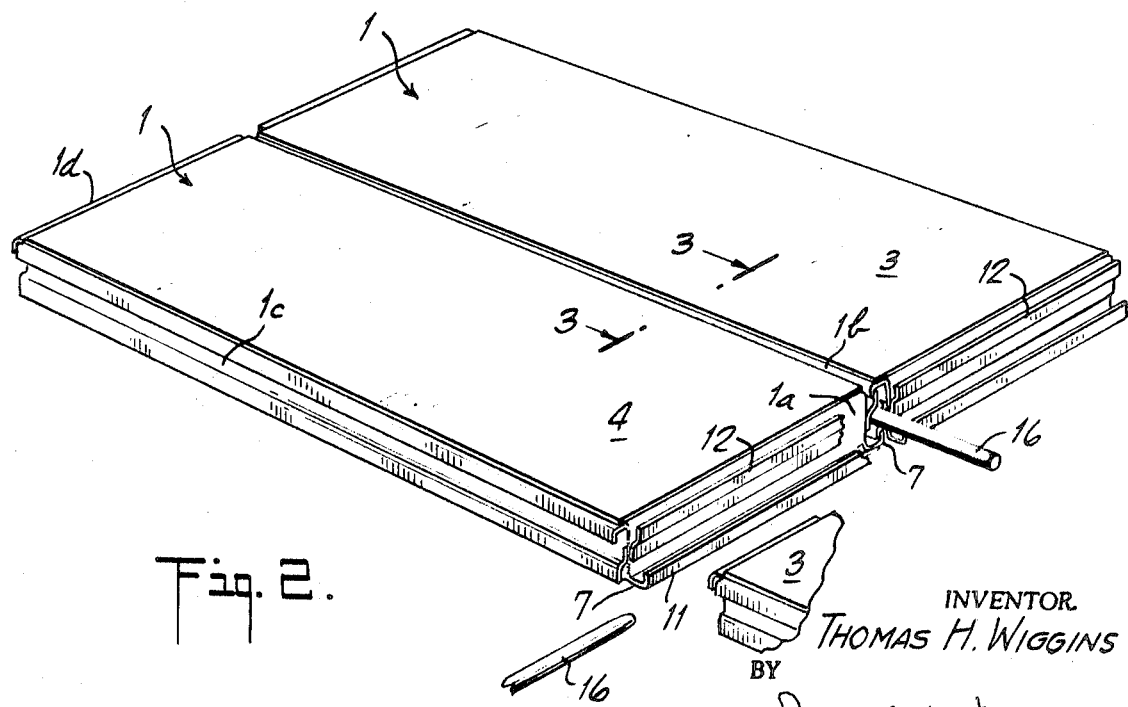
FIG. 2 is a perspective view of two interlocked panels of the type of the present invention.

FIGS. 2 and 3 show two interlocked panels of the present invention in a linear arrangement in greater detail. The individual panel 1 is constructed of two facing sheets 3 and 4 having a honeycomb core 5 disposed between them. The facing sheets 3 and 4 are preferably comparatively thin to lighten the weight of the overall panel, and constructed of stainless steel to achieve strength and durability under the adverse conditions generally experienced during use. The honeycomb core 5 is preferably constructed of aluminum and is bonded to the facing sheets 3 and 4.

The edge-connector structure is shown in detail in FIG. 3. The edge-connector member comprises a beam or rail member 6 of uniform thickness having a body portion 6a and flanges 7 and 8 at its opposite edges. The rail 6 is preferably of sheet steel bent to the desired configuration. The flanges 7 and 8 extend in opposite directions and are attached to the respective facing sheets 3 and 4 by welding the edge of each sheet to the outer surface of the respective flange. The rail 6 is directly and rigidly attached to the honeycomb core 5 by a suitable potting compound 9. A small portion 10 of the core 5 is cut away to accommodate the inwardly projecting flange 8. It will be seen that this structure and attaching method is quite easily fabricated and provides for direct transfer and good distribution to the core structure of the load imposed on the connector while permitting the use of comparatively thin and lightweight structural members.

The means for connecting and holding adjacent panels together comprises an end extension 11, on the outwardly projecting flange 7, and a tab member 12 on the side of the rail 6. The tab member 12 is welded to the rail 6 at a location on the body portion 6a near the median axis of the rail 6, and the tab may itself be a beam or rail coextensive with the main connector rail 6. The tab 12 may also be constructed from a series of aligned tabs with some spacing between them to achieve a further reduction in weight of overall panel, but a single integral sheet steel tab construction is preferred.

The tab 12 is formed with a portion 13 which is spot welded to the main rail 6 and has an extended portion 14 substantially parallel to the welded portion 13 and integrally connected to it by means of an inclined or curved connecting portion 15. Identical main rails 6 and tab structures 12 may be attached to all the edges of each panel 1. To connect two panels together, it is merely necessary to fit the flange extension 11 and the extended portion 14 of the tab member 12 on one panel respectively into abutting relationship with the inner surfaces of the tab extension 14 and flange extension 11 on the other panel as shown in FIG. 3. It will be seen that this connecting operation is a comparatively simple and mistakeproof procedure and requires nothing more than the rotation of one of the panels if the connecting members are not initially properly disposed, to be explained in more detail below.

The means for locking the connected panels together is shown as an elongated hollow tube or spline 16 which is adapted to fit between the welded portions 13 of the respective tab members 12 and to space these portions from each other. The lightweight spline tube 16 effects four-line contact between the connector members and engages the surfaces of the welded portions 13 of the tab members 12 as well as the surfaces of the inclined portions 15. The interposed spline 16 acts to space and spread the connectors to provide tight locking of the joint and allows the respective facing sheets 3 and 4 to form even surfaces on both sides of the resulting composite matting. A tubular member is preferred as a spline for its lightweight and tight-locking quality.

Connector members 6 may be attached to all of the panel edges in identical orientations with the flange 7 and end extension 11 welded to the facing sheet 3, or an alternative arrangement may be used as shown in FIGS. 2 and 4. The arrangement as seen in FIG. 2 has two adjacent sides 1a and 1b of the foreground panel 1 with the flange 7 attached to the lower facing sheet 3 and the other two adjacent sides 1c and 1d have the flange 7 attached to the upper facing sheet 4. This arrangement provides a symmetry in the construction of the panels and connectors so that the cover sheets 3 and 4 are identical in this arrangement. The arrangement also permits connecting any two panels together requiring no more than a simple rotation of one of the panels if necessary. The structural detail of the corner of a panel having oppositely oriented connecting members is shown in FIG. 4.

It will be seen that no matter how the respective panels are oriented when connected, the spline tube 16 is inserted in the identical position in every joint. By virtue of this locking arrangement the panels may be arranged in varying patterns in the overall matting as shown in FIG. 1. No matter what the comparative lengths of the adjacent edges of the panels may be when connected, a spline tube of any reasonable length may be inserted between them to effect locking therebetween. In addition the use of a rounded tube renders the locking operation comparatively rapid in contrast to different geometrically shaped keys which require a particular orientation for insertion.

Another connecting means with a modified form of tab member 17 is shown in FIG. 5. This tab member 17 like the former one 12, has a portion 13' which is spot welded to the main rail 6 in the vicinity of the median axis of the rail. Tab member 17 also has a portion 18 at its opposite end adapted to engage the flange extension 11 on a mating panel. In this tab, however, the extended portion 18 of the tab 17 is given an additional curvature 19 opposite from that of the integral inclined portion 15'. The additional curve 19 is also spot-welded to the surface of the main rail 6 as shown to provide additional attaching strength between the tab member 17 and the rail 6. The remaining parts of this modified connecting means are essentially identical to that of the former connecting means, and the tubular spline 16 is positioned against portions 13' and 15' to lock adjacent panels in place.

In preparing and fabricating the panel units, certain processes and material have been found to produce panels of maximum strength and durability. Although the facing panels have been identified as stainless steel, other materials may be used and may even be more desirable. The important factors to be considered in selecting the material in view of the thin gages to be used is that the material have the properties of a minimum yield point of 100,000 p.s.i., sufficient ductility to withstand forming without cracking and the ability to retain ductility where welded. One material which has been found to be suitable for this use is the alloy steel identified by the American Iron and Steel Institute designation No. 8620. The composition of this 8620 steel comprises:

| C | 0.18–0.23% | Si | 0.20–0.35 |
| Mn | 0.70–0.90 | Ni | 0.40–0.70 |
| P | 0.040 max | Cr | 0.40–0.60 |
| S | 0.040 max | Mo | 0.15–0.25 |

A preferred procedure for cleaning and preparing the steel panels and aluminum honeycomb prior to bonding consists of the following steps. First, the facing panels are immersion-cleaned in an alkali solution such as sodium hydroxide, soda, and trisodium phosphate, in a concentration of 6 to 8 ounces per gallon at a temperature in the range of 175° to 185° F. for approximately 5 minutes. The panels are then rinsed in hot water at a temperature from 175° to 185° F. and subsequently pickled in an acid bath, such as hydrochloric acid in a 10 percent concentration, at room temperature, that is, 60° to 80° F., for a period of 1 to 2 minutes. The plates are then rinsed in cold water, and a neutralizing bath of soda ash in a concentration of one-half to 1 ounce per gallon at room temperature for a period of 15 to 30 seconds is applied. The panels are then rinsed in hot water at a temperature from 160° to 180° F. and dried.

After vapor degreasing, the honeycomb is ready to be bonded to the clean facing panels. The preferred bonding procedure consists of applying a film-type adhesive between the panels and the honeycomb and pressing the composite structure together under a temperature of 400° F. for 5 minutes at 10 p.s.i. The adhesive found to give the highest beam shear strength is Minnesota Mining and Manufacturing Company's "Scotch-Weld" brand structural adhesive AF–110. Using an aluminum honeycomb of 1.675-inch thickness with 0.049-inch stock sheet steel for the connecting rails and spline tube and 0.015-inch alloy steel (No. 8620) for the facing sheets, a load of 3,880 pounds was required for failure in beam-shear testing.

An improved lightweight structural panel is thus disclosed having edge-connecting means which is simple, symmetrical, and easily fabricated and yet effective to form a tight connecting joint for constructing a load-carrying continuous surface from a number of identical panels. The five parts required are all comparatively thin and of lightweight and conventional construction and may be inexpensively fabricated to permit easy handling and ready assembly.

What I claim is:

1. A lightweight structural unit to be used with like units to construct a load-carrying composite surface of the type having:

a. upper and lower surface members;

b. spacer means disposed between said surface members; and c. connecting means attached to the surface members, the improvement wherein the connecting means comprises:

d. a rail member of uniform thickness having a body portion with inner and outer flanges on its opposite edges connected to said surface members, said outer flange having an end extension extending inwardly towards the plane of said inner flange;

e. a tab member attached to said rail member and having a portion spaced from and substantially parallel to said body portion on the same side as said end extension, said spaced portion adapted to cooperate with the end extension of a like structural unit in abutting the inside surface of the extension when the two structural units are matingly juxtaposed, and having a portion connecting said spaced portion to said rail member, said connecting portion having a surface inclined with respect to said spaced portion and said rail member and cooperating with the inclined surface of the tab member of the like structural unit to permit the insertion of a cylindrical member therebetween to space and lock the mated units.

2. A structural unit as claimed in claim 1 wherein the spacer means is a honeycomb core of aluminum.

3. A structural unit as claimed in claim 1 wherein the rail member is of sheet steel.

4. A structural unit as claimed in claim 1 wherein the tab member comprises two spaced substantially parallel portions integrally connected by an inclined portion.

5. A structural unit as claimed in claim 4 wherein one of said spaced portions is welded to the rail member.

6. A structural unit as claimed in claim 4 wherein the tab member comprises two spaced substantially parallel portions integrally connected by two oppositely curved portions.

7. A structural unit as claimed in claim 6 wherein one of said spaced tab portions and one of said curved tab portions is welded to the rail member.

8. A structural unit as claimed in claim 1 wherein the unit has four sides with two adjacent sides having the rail flange with the end extension attached to the edge of the upper surface member and the other two adjacent sides having the rail flange with the end extension attached to the edge of the lower surface member.

9. A lightweight load-carrying composite surface made up of like structural units comprising:
a. a plurality of stainless steel facing sheets;
b. a plurality of honeycomb cores each disposed between and bonded to an upper and lower facing sheet;
c. a plurality of stainless steel rail members each having a body portion with integral flanges extending in opposite directions on its opposite edges, one of said flanges having an end extension substantially parallel to and adjacent said body portion, said rail members being attached to said cores and having their flanges welded to the edges of the facing sheets on one side of the structural unit;
d. a plurality of tab members each welded to a respective rail member and each having a portion spaced from and substantially parallel to the body portion of the respective rail member on the same side as the end extension, said tab members cooperating with the end extensions of like structural units in abutting the inside surfaces of the extensions when two structural units are matingly juxtaposed; and
e. a plurality of tubular members insertable between the tab members on mated units to space and lock the units together.